(12) United States Patent
Cox et al.

(10) Patent No.: US 10,225,985 B2
(45) Date of Patent: Mar. 12, 2019

(54) PICK-UP DEVICE OF A FORAGE IMPLEMENT

(71) Applicant: Vermeer Manufacturing Company, Pella, IA (US)

(72) Inventors: Nathan A. Cox, Pella, IA (US); Alex Knee, Urbandale, IA (US); Ryan G. Walker, Reasnor, IA (US)

(73) Assignee: Vermeer Manufacturing Company, Pella, IA (US)

( * ) Notice: Subject to any disclaimer, the term of this patent is extended or adjusted under 35 U.S.C. 154(b) by 17 days.

(21) Appl. No.: 15/183,165

(22) Filed: Jun. 15, 2016

(65) Prior Publication Data

US 2016/0366826 A1 Dec. 22, 2016

Related U.S. Application Data

(60) Provisional application No. 62/182,871, filed on Jun. 22, 2015.

(51) Int. Cl.
*A01D 89/00* (2006.01)

(52) U.S. Cl.
CPC ......... *A01D 89/001* (2013.01); *A01D 89/002* (2013.01)

(58) Field of Classification Search
CPC .... A01D 89/002; A01D 89/00; A01D 89/008; A01F 15/106; A01F 15/101; A01F 2015/102; Y10S 56/24
See application file for complete search history.

(56) References Cited

U.S. PATENT DOCUMENTS

| 1,877,519 | A | * | 9/1932 | MacGregor | A01D 41/10 56/364 |
|---|---|---|---|---|---|
| 2,256,829 | A | * | 9/1941 | Hyman | A01D 89/002 56/364 |
| 3,226,921 | A | * | 1/1966 | Shepley | A01D 57/02 53/341 |
| 3,613,345 | A | * | 10/1971 | Cofer | A01D 89/002 56/364 |
| 3,713,283 | A | * | 1/1973 | Fritz | A01D 89/002 56/364 |
| 4,161,859 | A | * | 7/1979 | Storm | A01D 89/002 56/364 |
| 5,052,171 | A | * | 10/1991 | Bich | A01D 89/002 56/364 |
| 5,426,928 | A | * | 6/1995 | Frimml | A01D 89/002 56/341 |

(Continued)

FOREIGN PATENT DOCUMENTS

| DE | 8515118 U1 | 3/1988 |
|---|---|---|
| DE | 102006001338 A1 | 7/2007 |
| GB | 835045 A | 5/1960 |

OTHER PUBLICATIONS

European Search Report, European Patent Application No. 16175025.2-1655, dated Feb. 9, 2016, pp. 8.

*Primary Examiner* — Arpad Fabian-Kovacs
(74) *Attorney, Agent, or Firm* — Armstrong Teasdale LLP

(57) ABSTRACT

Pick-up devices of a forage implement such as a round baler may include stripper bands that define slots between the stripper bands to allow tines to pass through during rotation of the tines. The pick-up device may include a back-plate for attaching stripper bands that includes chambers to receive the bands.

21 Claims, 11 Drawing Sheets

(56) References Cited

U.S. PATENT DOCUMENTS

| | | | | |
|---|---|---|---|---|
| 6,314,709 | B1* | 11/2001 | McClure | A01D 89/002 56/132 |
| 6,370,856 | B1* | 4/2002 | Engel | A01D 90/02 198/676 |
| 6,595,123 | B2* | 7/2003 | Schrag | A01F 15/101 100/97 |
| 6,651,418 | B1* | 11/2003 | McClure | A01F 15/106 56/341 |
| 7,478,523 | B2* | 1/2009 | McClure | A01D 89/002 56/364 |
| 7,516,604 | B2* | 4/2009 | Josset | A01D 89/002 56/364 |
| 8,056,314 | B1* | 11/2011 | Anstey | A01F 15/106 56/364 |
| 8,181,435 | B1* | 5/2012 | McClure | A01D 89/002 56/364 |
| 8,893,463 | B2 | 11/2014 | Pourchet et al. | |
| D746,876 | S* | 1/2016 | McClure | D15/28 |
| 9,426,942 | B2* | 8/2016 | Kappelman | A01D 89/002 |
| 9,578,809 | B2* | 2/2017 | Reiter | A01D 89/004 |
| 9,668,422 | B2* | 6/2017 | Ubaldi | A01D 89/002 |
| 2003/0110752 | A1* | 6/2003 | Dow | A01D 89/00 56/364 |
| 2003/0213223 | A1* | 11/2003 | Derscheid | A01D 89/004 56/341 |
| 2006/0242937 | A1* | 11/2006 | Pourchet | A01D 89/002 56/219 |
| 2007/0107402 | A1* | 5/2007 | McClure | A01D 89/002 56/14.4 |
| 2008/0141641 | A1* | 6/2008 | Derscheid | A01D 80/02 56/341 |
| 2009/0025358 | A1* | 1/2009 | Woodford | A01D 89/002 56/364 |
| 2009/0320434 | A1* | 12/2009 | Pourchet | A01D 89/002 56/364 |
| 2013/0167501 | A1* | 7/2013 | Seeger | A01D 89/002 56/364 |
| 2014/0109543 | A1* | 4/2014 | Ubaldi | A01D 89/002 56/376 |
| 2015/0230407 | A1* | 8/2015 | Rieter | A01D 89/004 56/350 |
| 2015/0366138 | A1* | 12/2015 | Kappelman | A01D 89/002 56/364 |

* cited by examiner

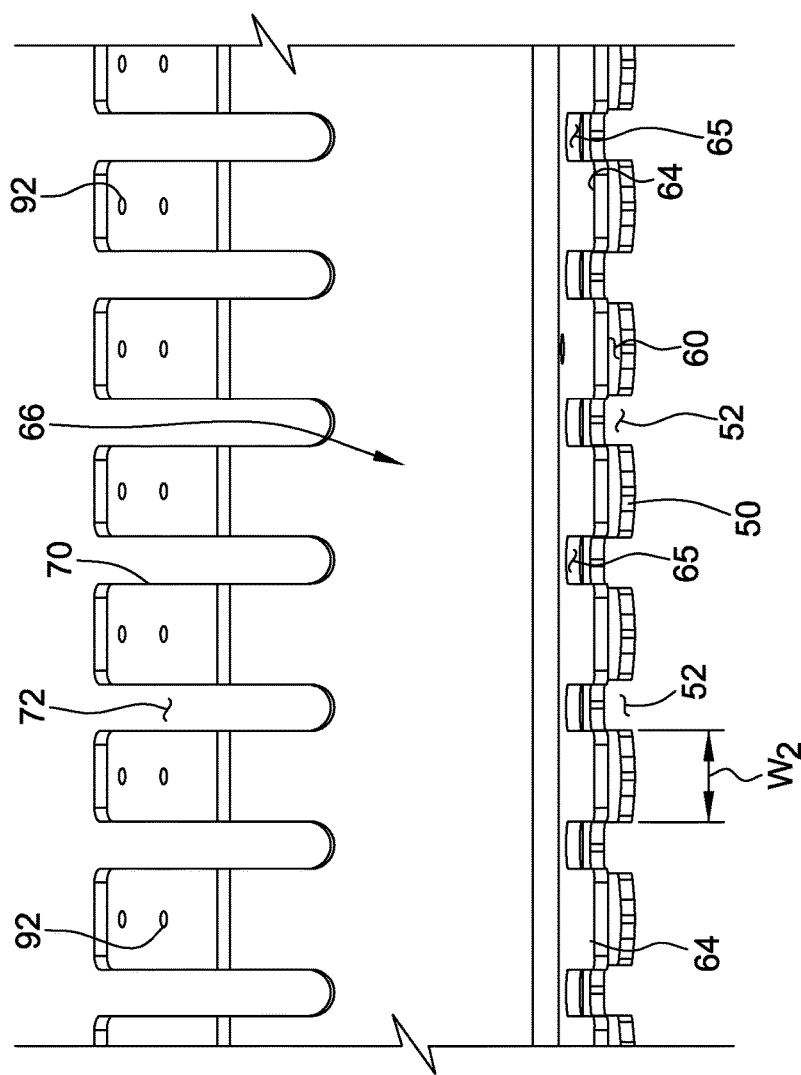

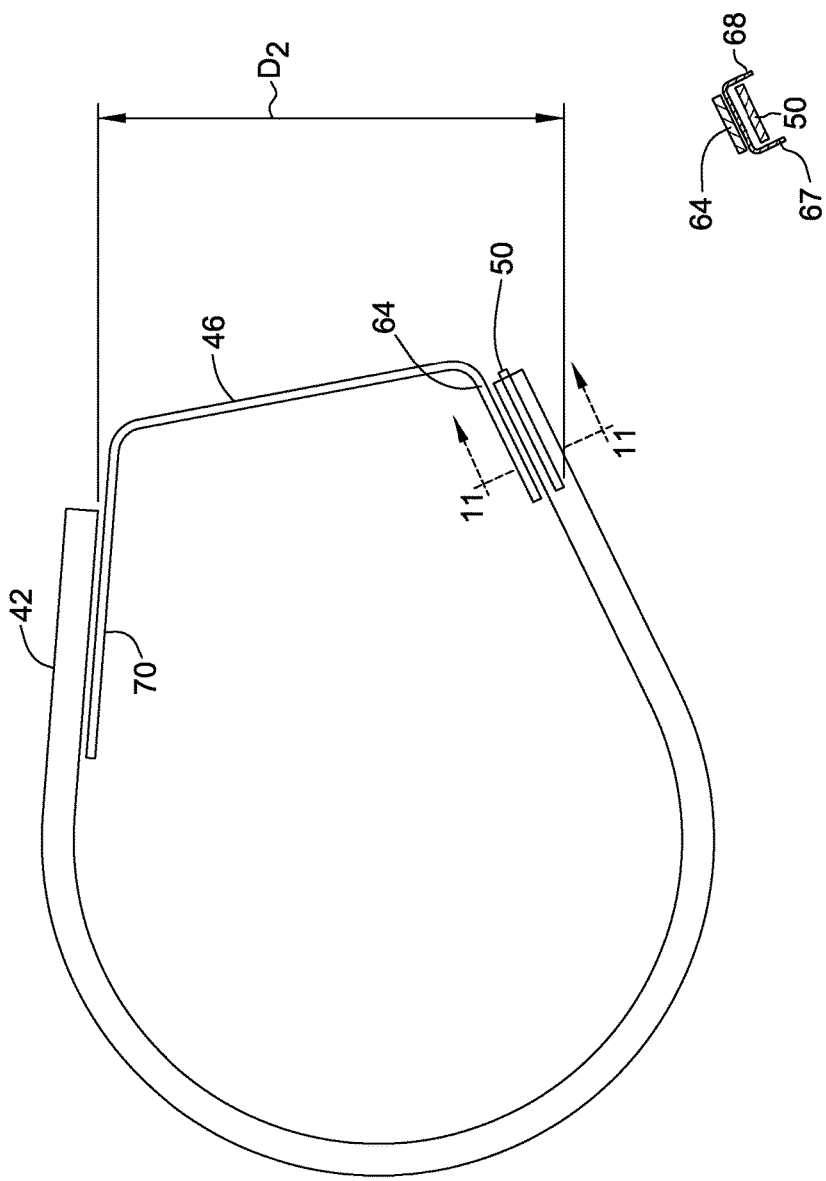

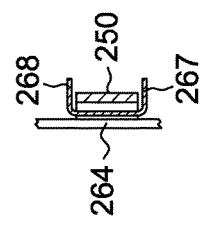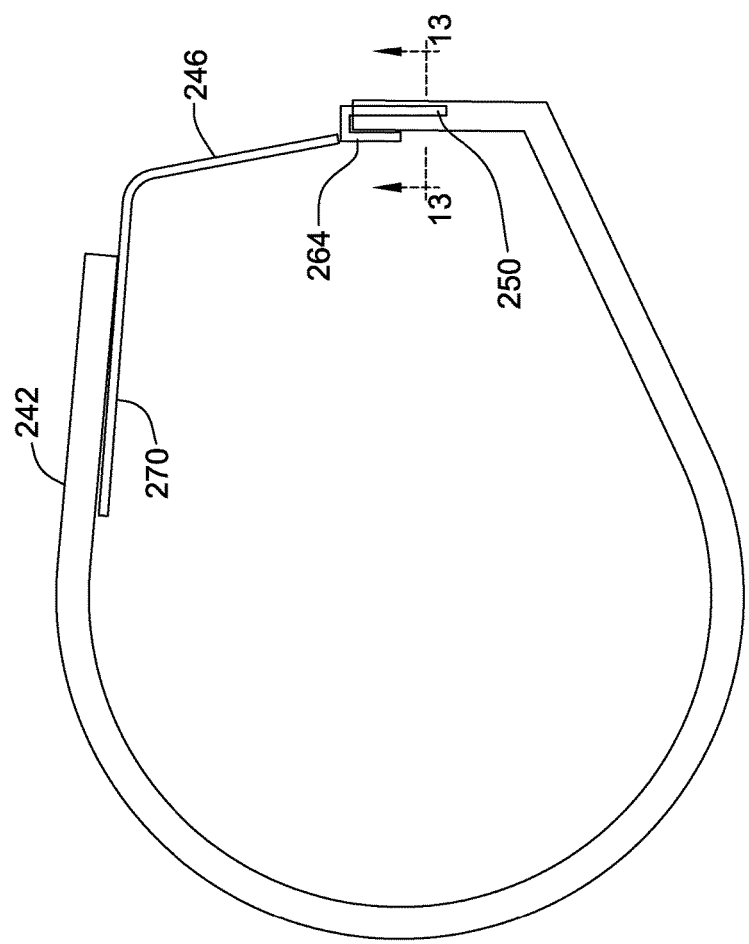

PICK-UP DEVICE OF A FORAGE IMPLEMENT

CROSS-REFERENCE TO RELATED APPLICATION

This application claims the benefit of U.S. Provisional Patent Application No. 62/182,871, filed Jun. 22, 2015, the contents of which are incorporated herein by reference in their entirety.

FIELD OF THE DISCLOSURE

The field of the disclosure relates to pick-up devices of a forage implement such as a round baler and, in particular, a back-plate of the pick-up device for attaching stripper bands for removing forage material from the pick-up device.

BACKGROUND

Forage implements have become an integral part of the agricultural industry. A variety of different types of implements that process cut crops such as crop or forage harvesters (e.g., round or square balers) and windrow mergers are currently in use. Most forage implements use a pick-up device to convey the crop forage material from the surface over which the implement travels into the implement. The pick-up device typically includes a number of tines attached to a shaft or tine bar. The tines of the pick-up device rotate to allow the tines to grasp forage material and convey the material into the implement. The tines rotate through slots formed between stripper bands to remove the forage material from the tines. Conventional pick-up devices include stripper bands that are fastened, by use of fasteners (e.g., bolts, pins, keyhole fasteners and the like), at both ends thereof to the pick-up device.

Maintenance of the pick-up device may include removing the stripper bands to access the tines and tine bar. Field maintenance is difficult as the service technician must position himself or herself below the pick-up device to unfasten the stripper bands at their lower ends.

A need exists for forage implement pick-up devices that may be maintained with greater ease and that securely fasten the stripper bands.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a pick-up device of a forage implement. The pick-up device includes stripper bands having a first end and a second end. The stripper bands define slots between the stripper bands for tines to pass through during rotation of the tines. A back-plate defines back-plate chambers. Each stripper band is received in a back-plate chamber.

Another aspect of the present disclosure is directed to a back-plate for securing stripper bands of a pick-up device of a forage implement having a lengthwise axis. The pick-up device has rotating tines for transferring forage material from a surface over which the implement travels into the implement, the stripper bands having a first end and a second end. The back-plate includes a plurality of teeth for engaging the stripper bands at their first end to limit the movement of the stripper bands in a direction transverse to a lengthwise axis of the implement. The back-plate includes a tab plate for engaging the stripper bands at their second end to limit vertical movement of the stripper bands.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

FIG. 9 is a front view of the back-plate;

FIG. 10 is a side view of the back-plate and a stripper band;

FIG. 11 is a cross-section of the back-plate and stripper band taken through line 11-11 of FIG. 10;

FIG. 12 is a side view of another embodiment of the back-plate and the stripper band; and FIG. 13 is a cross-section of the back-plate and stripper band taken through line 13-13 of FIG. 12.

Corresponding reference characters indicate corresponding parts throughout the drawings.

DETAILED DESCRIPTION

Figure 1:
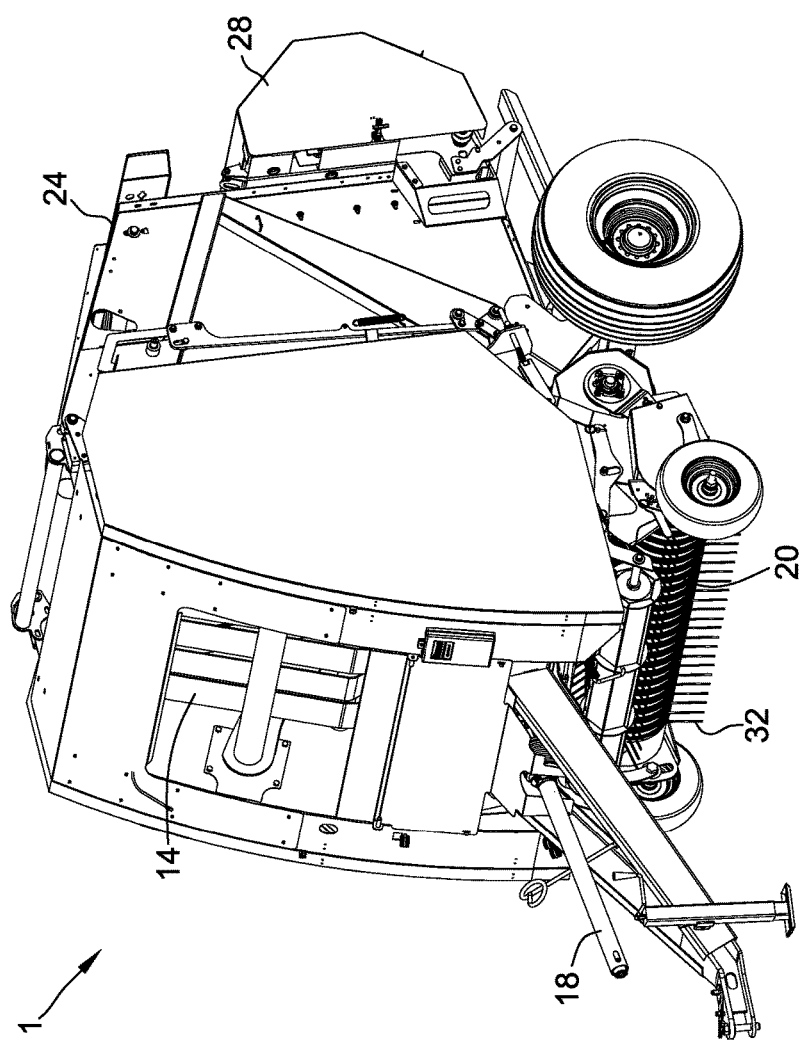
FIG. 1 is a perspective view of a forage implement shown as a round baler.
Figure 2:
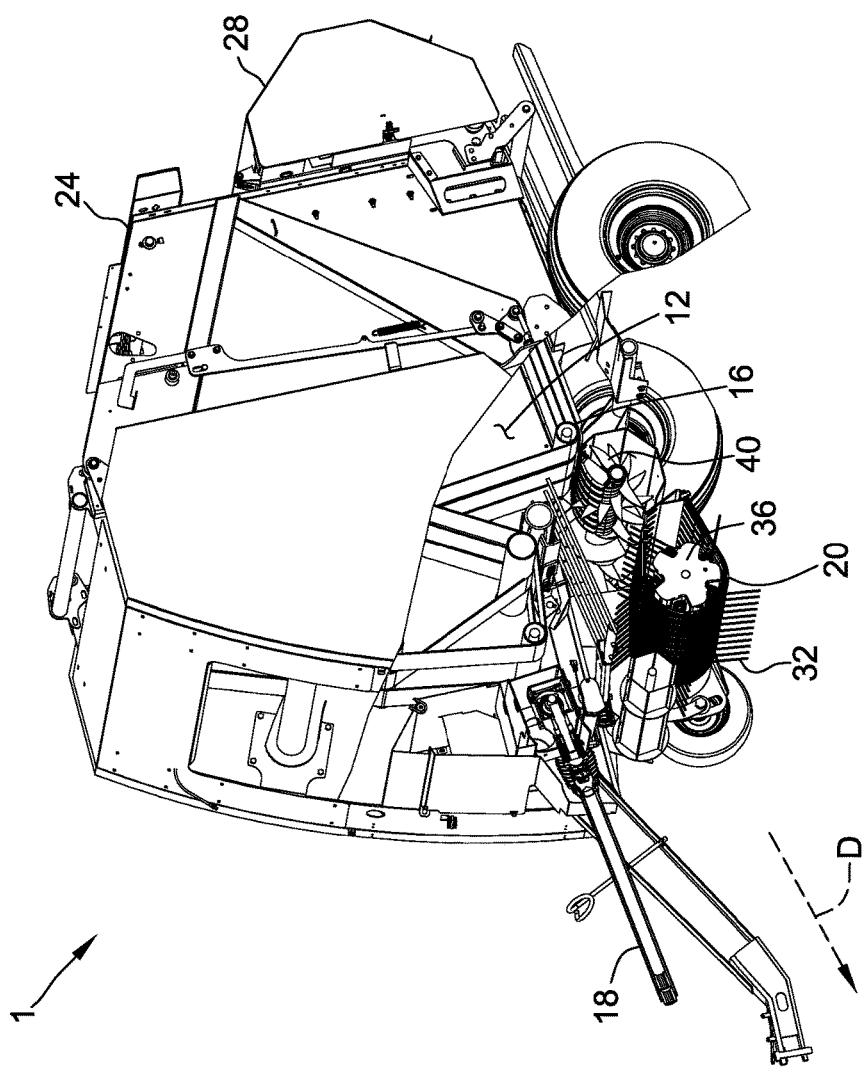
FIG. 2 is a perspective cross-section view of the round baler.

Referring now to FIGS. 1 and 2, an implement 1 for forming round bales from crop forage material is shown. While the implement 1 is generally shown and described herein as a round baler, any implement that includes a pick-up device 20 having tines 32 such as windrow mergers and other crop or forage harvesters may be used. The baler 1 includes an expandable baling chamber 12 which operates by utilizing a series of bale forming belts 14 routed around a series of rollers 16. Alternatively, a single bale forming belt may be used. Additionally, the baler 1 includes a PTO drive 18, a single or a plurality of belt tighteners (not shown) and a lift gate 24.

The baler 1 includes a lengthwise axis D that corresponds to the direction of travel of the baler. As the baler 1 moves forward, crop material is picked up by the pick-up device 20. As used herein, crop material includes any cut crop material that may be conducive to pick-up and/or baling and should not be limited to crop materials used by livestock. As the crop material is deposited in the baling chamber 12, the material is compressed by the plurality of bale forming belts 14. Tension is maintained in the bale forming belts 14 by the series of belt tighteners to ensure a properly compressed bale. Once a full bale (not shown) is formed, pickup is ceased, and a wrapping sequence is commenced by a wrapping device 28. The wrapping device 28 is configured to apply a layer of wrap material to the outer circumference of the completed bale. Once the wrapping sequence is completed, the operator ejects the full bale from the baling chamber 12 by opening the lift gate 24.

Figure 3:
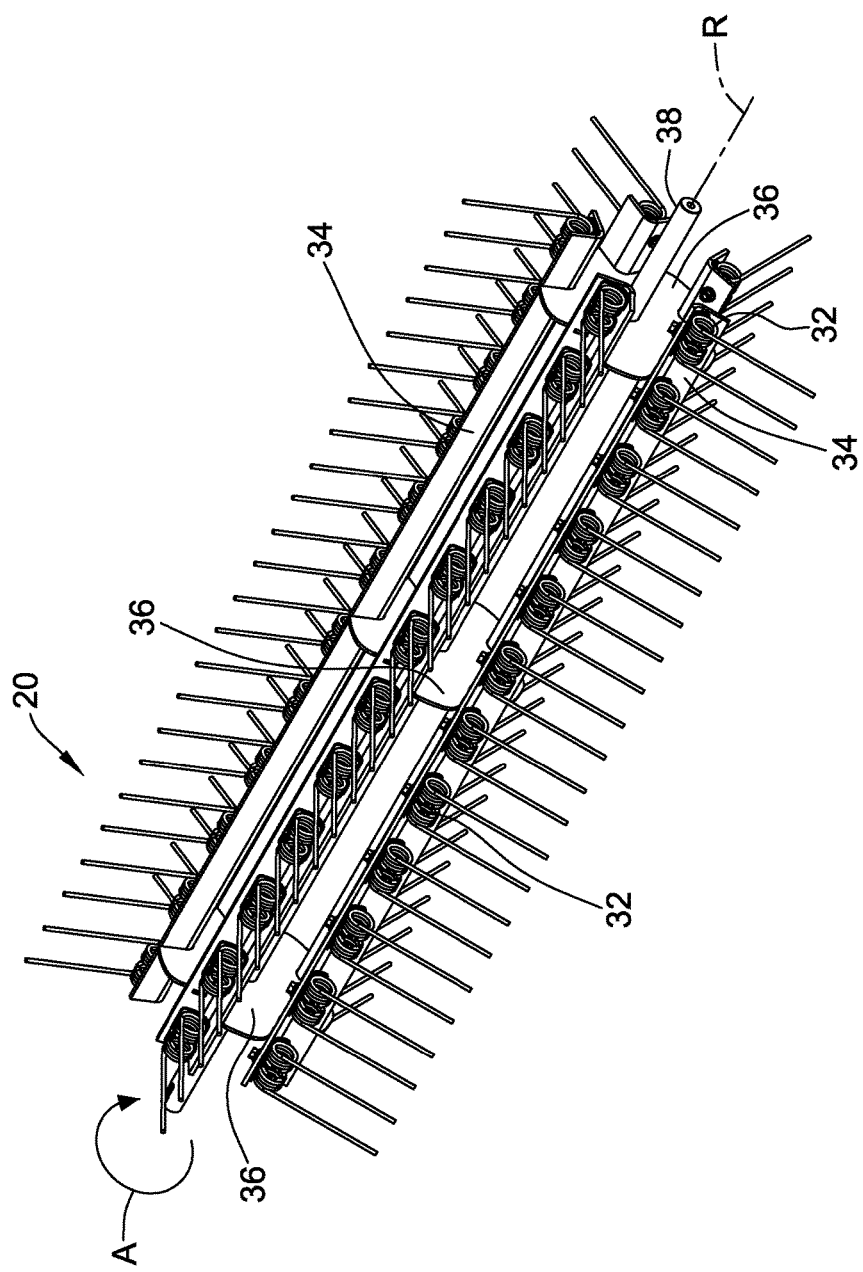
FIG. 3 is a perspective view of a pick-up device of the round baler.

The pick-up device 20 (FIG. 3 with stripper bands not shown) includes a number of tines 32 for transferring crop forage material from the surface over which the baler 1 travels and into the baling chamber 12. As the tines 32 rotate about the axis of rotation R of the device 20 in the direction indicated by arrow A, the tines 32 pick-up crop material and direct it toward the baling chamber 12 (FIG. 2). The pick-up device 20 may include rows of tines 32, as shown in FIG. 3, or the tines 32 may be provided in a staggered or "cammed" arrangement.

The pick-up device 20 includes a number of supports (shown as tine bars) 34 to which the tines 32 are attached. Each tine bar 34 is attached to supporting disks 36. A shaft 38 is attached the supporting disks 36 for rotation of the pick-up device 20.

Figure 4:
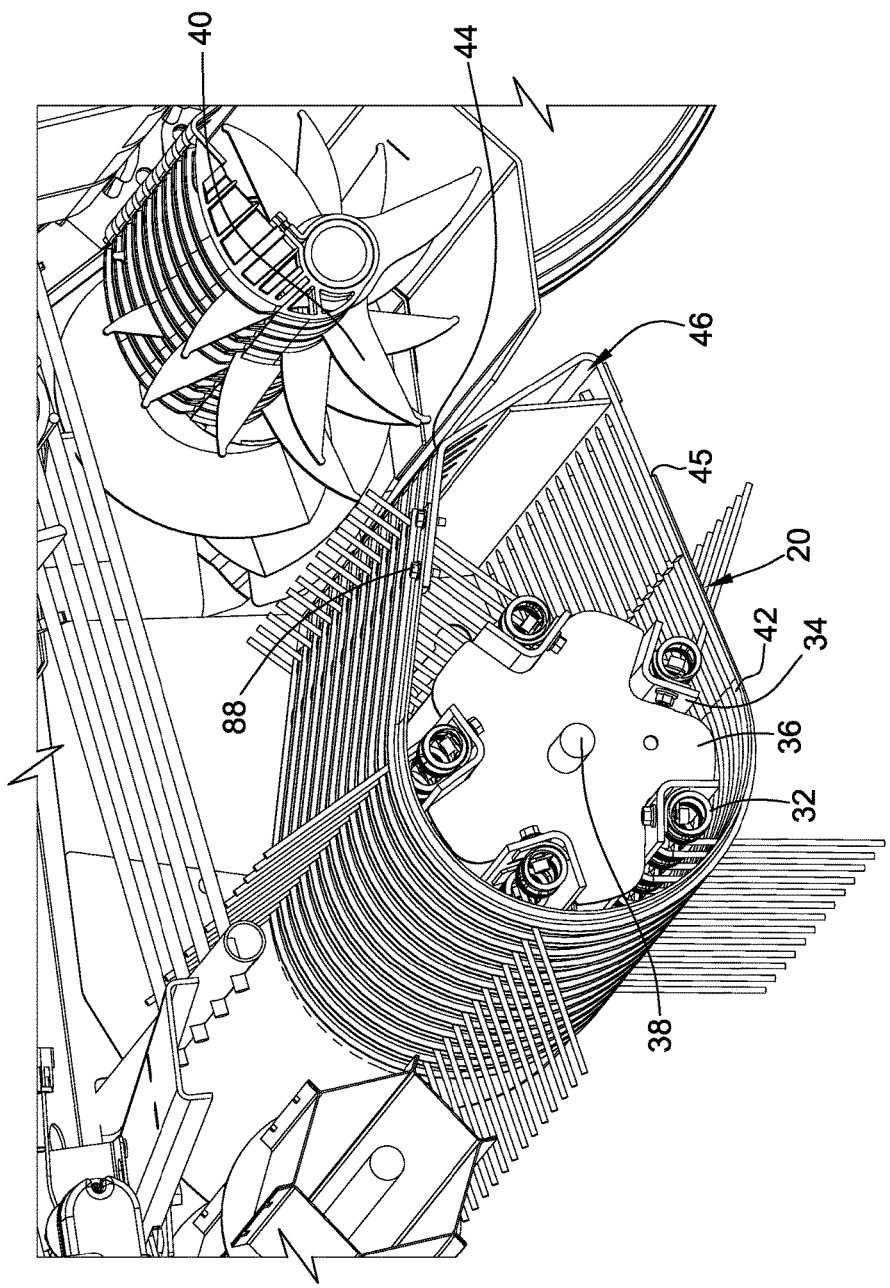
FIG. 4 is a perspective cross-section view of the pick-up device.

The pick-up device 20 also includes stripper bands 42 (FIG. 4). As the tines 32 rotate about the axis of rotation R (FIG. 3), the tines 32 pass through slots formed between stripper bands 42. The stripper bands 42 assist to remove forage material from the tines 32 and convey it toward a rotor assembly having rotor teeth 40. The rotor assembly feeds the crop forage material toward the belts 14 (FIG. 2) to allow the material to be incorporated into the growing bale (not shown).

The stripper bands 42 are generally arcuate (e.g., u-shaped or horseshoe shaped) and include a first (i.e., lower) end 45 (FIG. 5) and a second (i.e., upper) end 44. Each stripper band 42 includes a base 62 (FIG. 6) and a first flange 67 and a second flange 68 that extend from the base 62. The first flange 67 and the second flange 68 are separated by a distance $W_1$. Each stripper band 42 includes contact surfaces 69 for contacting and separating forage material from the tines 32 (FIG. 4). The stripper band 42 also includes an inner surface 71.

Figure 5:
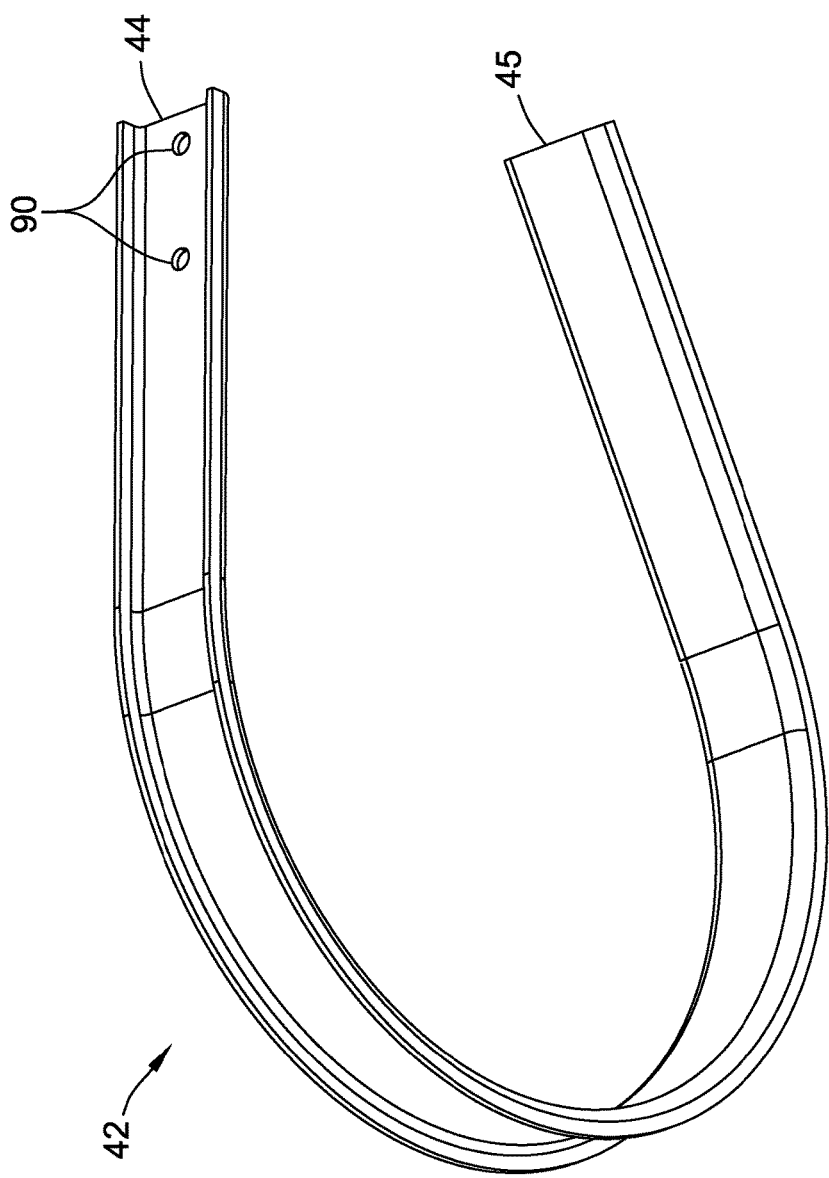
FIG. 5 is a perspective view of a stripper band of the pick-up device.

A distance $D_1$ separates the first end 45 and second end 44 of the stripper band 42. The first end 45 and the second end 44 may flare inwardly toward one another as shown in FIGS. 5 and 10 such that the loop portion of the stripper band 42 is wider (i.e., as measured at its greatest width) than the distance $D_1$ between its first end 45 and second end 44.

Each stripper band 42 is secured by a back-plate 46 (FIG. 4). The back-plate 46 includes a number of teeth 50 (FIGS. 7-9) for engaging the stripper bands 42 (FIG. 5) at their first end 45. The teeth 50 together form a tooth plate or "comb" 53. The flanges 67, 69 of the stripper band 42 flank a corresponding tooth 50 at its sides. In this arrangement, the teeth 50 limit movement of the stripper bands 42 in a direction transverse to the lengthwise axis D of the baler 1 (FIG. 1) (i.e., side to side).

Each tooth 50 has a width $W_2$. The width $W_2$ of each tooth 50 is substantially equal to or even less than the distance $W_1$ between the first 67 and second flanges 68 of the stripper band 42 to allow the tooth 50 to be positioned between the flanges 67, 68 to laterally retain the stripper band 42. By arranging the width $W_2$ of the tooth 50 to be less than the distance $W_1$ between flanges 67, 68 (FIG. 11), each stripper band 42 may be slid within its corresponding chamber 60 (FIG. 9) when securing the bands 42 to the back-plate 46 and during use of the baler (e.g., when the stripper band 42 contacts the ground or an object protruding from the ground). The teeth 50 define teeth slots 52 between the teeth 50 for the tines 32 (FIG. 4) to pass through.

Tabs 64 (FIG. 7) of a tab plate 54 engage the stripper bands 42 (FIG. 5) at their first end 45 to limit vertical movement of the stripper bands 42 (i.e., movement relative to a vertical axis of the baler 1). In this arrangement, each tooth 50 and corresponding tab 64 form a chamber 60 (FIG. 9) for receiving the stripper band 42. The stripper band 42 is secured within the chamber 60 between the tooth 50 and the tab 64 which limit movement of the stripper band 42. The stripper band 42 is not fastened to the tooth 50 or tab plate 54 (i.e., with a bolt or with pins, key-hole fastener or the like). This allows the stripper band 42 to slide within the chamber 60.

The tabs 64 define tab plate slots 65 between the tabs 64 for the tines 32 (FIG. 4) to pass through during rotation. The teeth slots 52 and tab plate slots 65 are vertically aligned. While the teeth 50 and tab plate 54 are shown in the illustrated embodiment as having slots 52, 65 for the tines to pass through, the teeth 50 and tab plate 54 may be offset from the arc of rotation of the tines 32 (FIG. 4) such that slots 52, 65 are not used.

The back-plate 46 also includes a fastening plate 66 having a number of fastening tabs 70. The fastening tabs 70 are attached to the stripper bands 42 at their second ends 44. The fastening tabs 70 define fastening plate slots 72 (FIG. 9) for the tines 32 (FIG. 4) to pass through. In other embodiments, the fastening plate 66 is off-set from the arc of rotation of the tines 32 and does not include slots 72. The ends of the fastening tabs 70 and the opening to the chamber 60 formed between the tabs 64 and teeth 50 are separated by a distance $D_2$ (FIG. 10). The back-plate 46 is attached to the side panels of the pick-up device 20 by a connecting plate (not shown) that is bolted to the side panels.

Figure 7:
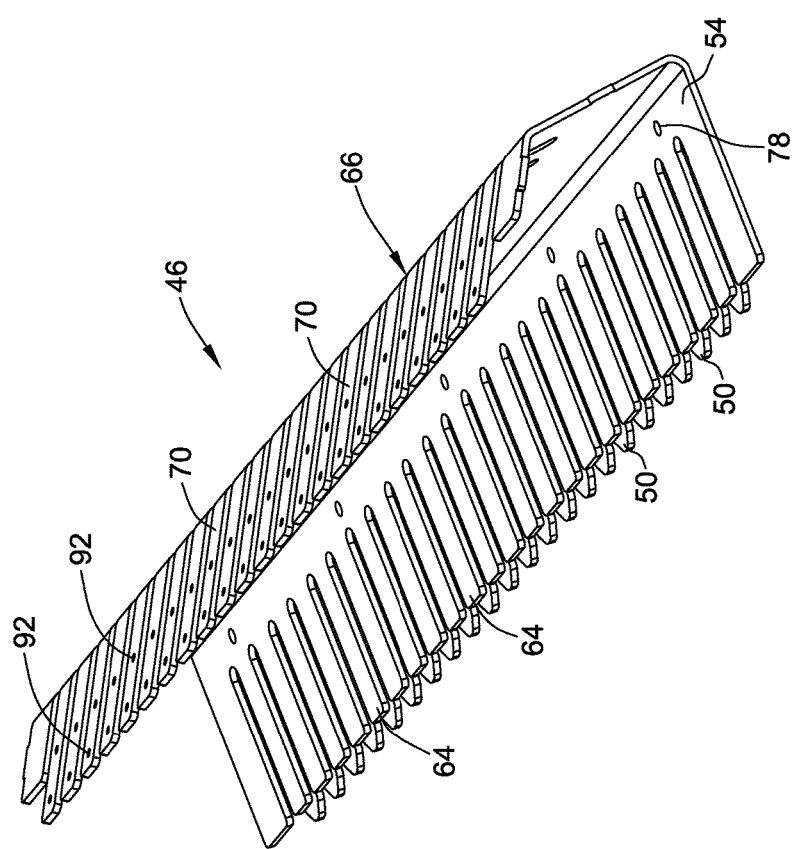
FIG. 7 is a perspective view of a back-plate of the pick-up device.
Figure 8:
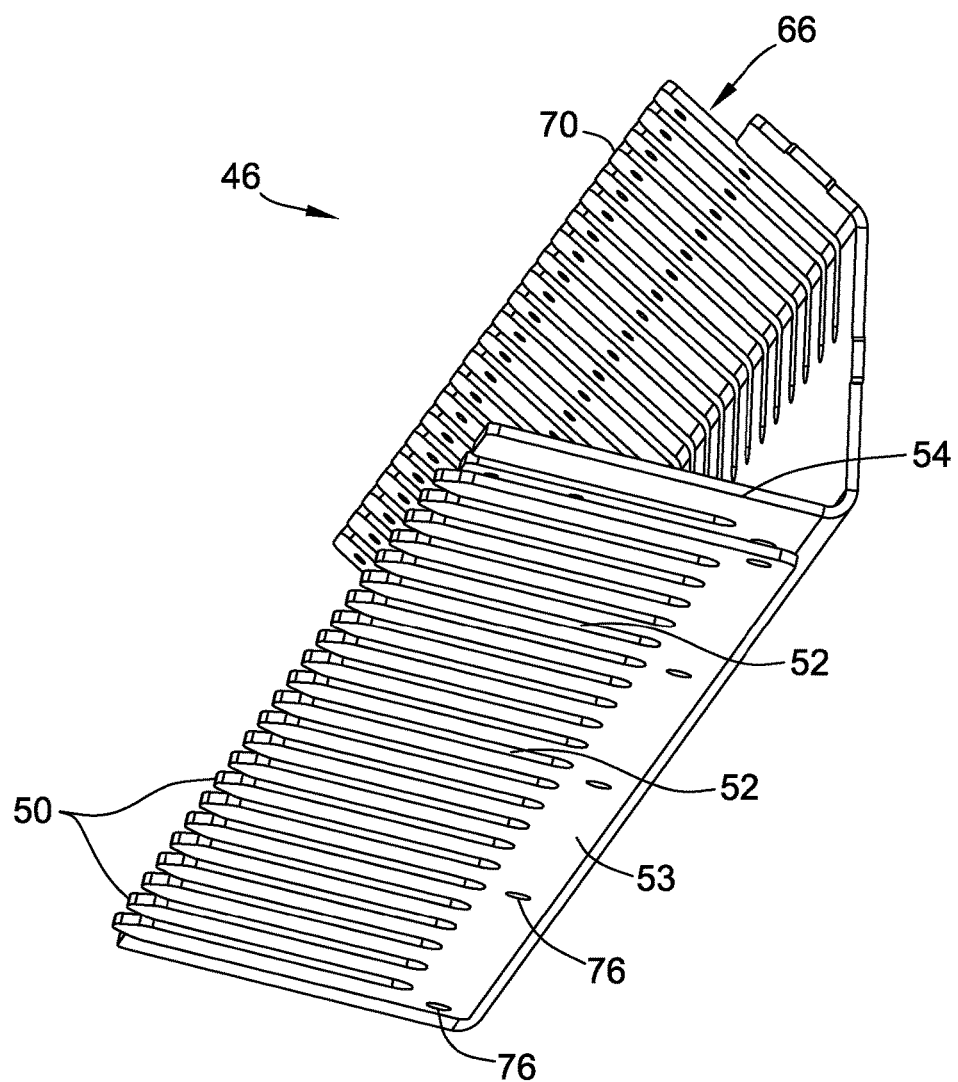
FIG. 8 is another perspective view of the back-plate.

As shown in FIG. 7, the fastening plate 66 and the chamber 60 formed between the tab plate 54 and teeth 50 angle away from each other toward their ends at which the fastening plate 66 and chamber 60 engage the stripper bands 42 (FIG. 4). By biasing the first end 45 and second end inward toward each other as shown in FIGS. 5 and 10 and by biasing the chamber 60 and fastening tabs 70 away from one another, the stripper band 42, fastening tabs 70, tabs 64 and teeth 50 interact with one another in such a manner to resist the pull-out of the stripper band 42 from its corresponding chamber 60 of the back-plate 46. This mounting construction, in turn, especially when considered in conjunction with the lateral retention offered by the flanges 67, 68, may permit the use of fewer fasteners. In other embodiments, the fastening plate 66 angles toward the tab plate 54 and comb 53, or the fastening plate, tab plate and comb plate are parallel.

In the illustrated embodiment, the distance $D_2$ between the end of the fastening tabs 70 and the opening of the chamber 60 formed between the tabs 64 and teeth 50 is greater than the distance $D_1$ between the first end 45 and second end 44 of the stripper band 42. This creates an outward spring bias of the stripper band 42 upon installation on the back-plate 46 which causes the stripper band 45 to apply a downward force on tooth 50 which further resists pull-out of the stripper band 42 from the chamber 60.

The tab plate 54 and fastening plate 66 are illustrated as being one piece with the comb 53 being fastened to the tab plate 54. The tab plate 54 may be spaced from the comb 53 by a shim plate (not shown) between the tab plate 54 and comb 53. The comb 53 may be fastened through comb apertures 76 (FIG. 8) and tab plate apertures 78 (FIG. 7). In other embodiments, the comb 53 is integral with the tab plate 54 and/or the fastening plate 66; or the comb 53, tab plate 54, fastening plate 66 are all separate pieces that are fastened together.

Alternatively or in addition to the back-plate 46 having chambers 60 to secure the first ends 45 of the stripper bands 42, the back-plate 46 may include chambers (not shown) for securing the stripper bands 42 at their second ends 44.

As shown in FIG. 10, the back-plate 46 is arranged such that the teeth 50 and tab plate 64 are directed downward toward the surface over which the implement travels at their ends. Another embodiment of the back-plate and stripper band is generally referred to as "242" and "246", respectively, in FIGS. 12-13. The components shown in FIGS. 12-13 that are analogous to those of FIGS. 1-11 are designated by the corresponding reference number of FIGS. 1-11 plus "200" (e.g., part 50 becomes 250). In the embodiment of FIGS. 12-13, the teeth 250 and tab plate 264 are perpendicular to the surface over which the implement travels.

Figure 6:
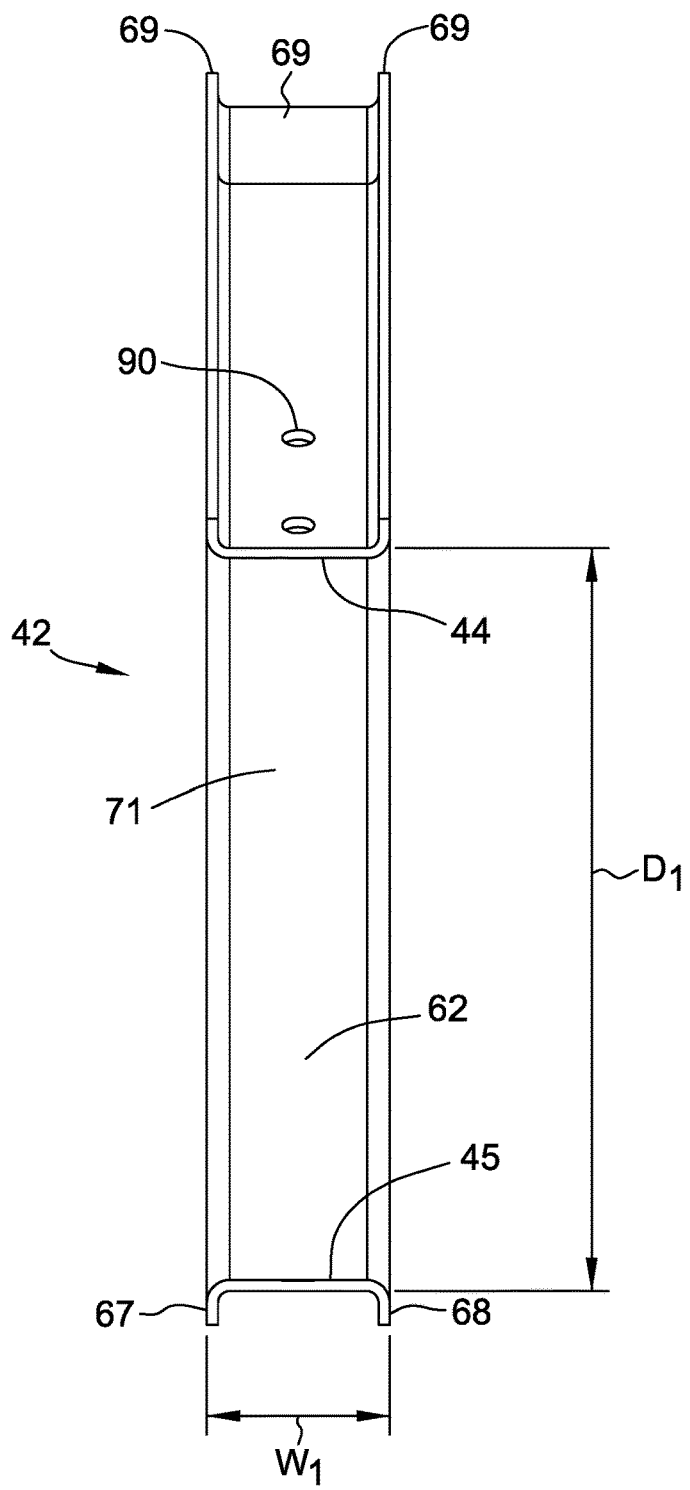
FIG. 6 is a rear view of the stripper band.

As referred to herein, the "chambers" 60 of the back-plate 46 need not be enclosed on all sides and the term "chamber" should not be considered in a limiting sense. The shape of the chamber 60 (FIG. 9) formed between the tab plate 54 (FIG. 7) and tooth 50 generally corresponds to the shape of the portion of the stripper band 42 received therein (i.e., base 62). The chambers 60 may generally be formed in any arrangement in which the chambers 60 have a shape capable of receiving the stripper band 42 (or a portion thereof) and limiting the movement of the stripper band 42 in a vertical direction and a direction transverse to the lengthwise axis D (FIG. 2) of the baler 1. The stripper band 42 may have a u-shaped cross-section as shown in FIG. 6 or may have a different profile (e.g., circular cross-section). The stripper band 42 may include portions with different shapes. In some embodiments, the striper band includes a first portion with a contact surface for contacting the forage material and includes another portion(s) having a different shape for attachment to the back-plate 46.

The stripper bands 42 may be secured to the baler by sliding the first end 45 (FIG. 4) of the band 42 through the chamber 60 (FIG. 9) formed between the teeth 50 and the tabs 64. During insertion, the tooth 50 is between the first and second flanges 67, 68 of the band 42 and guides the stripper band 42 into the chamber 60. The stripper band 42 may be slid fully to the end of the tooth 50 or only partially inserted within the chamber 60. After insertion of the band 42 into the chamber 60, the band 42 may be fastened to the fastening plate 66 at its second end 44 by use of fasteners 88 (two shown in FIG. 4) secured through stripper band apertures 90 (FIG. 5) and fastening plate apertures 92 (FIG. 7).

Compared to conventional pick-up devices, the pick-up device 20 of the present disclosure has several advantages. By securing the stripper bands 42 within a chamber 60 of the back-plate 46 at their first ends 45 rather than fastening the stripper bands 42 at their first ends 45 to the back-plate 46, the stripper bands 42 may be attached and detached from the baler easier, as the technician does not need to manipulate fasteners from below the pick-up device 20. The stripper band 42 does not include any fastening elements at its first end 45 for attaching to the back-plate 46, which simplifies the manufacturing process of the band 42. In some embodiments, the pick-up device 20 is compatible with and capable of receiving conventional stripper bands 42. In embodiments in which first ends 45 and second ends 44 of the stripper band 42 angle toward each other and the fastening plate 66 and chamber 60 angle away from each other toward their ends at which the fastening plate 66 and chamber 60 engage the stripper bands 42, pull-out of the stripper band 42 from its corresponding chamber 60 of the back-plate 46 may be resisted. In embodiments in which the distance $D_2$ between the end of the fastening tabs 70 and the opening of the chamber 60 formed between the tabs 64 and teeth 50 is greater than the distance $D_1$ between the first end 45 and second end 44 of the stripper band 42, pull-out of the stripper band 42 from its corresponding chamber 60 of the back-plate 46 may be resisted.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A pick-up device of a forage implement, the pick-up device comprising:
    stripper bands having a first end and a second end, the stripper bands defining slots between the stripper bands for tines to pass through during rotation of the tines; and
    a back-plate having a first portion comprising a fastening plate connected to the stripper bands toward their second ends, a second portion having tabs and teeth, each tab cooperating with a tooth to define a back-plate chamber, each stripper band being received in a back-plate chamber toward its first end, each stripper band not being fastened to the tab and tooth that define the back-plate chamber in which the stripper band is received, wherein, as finally assembled, the pick-up device is free of pins that restrict the stripper bands from moving relative to the second portion of the back-plate.

2. The pick-up device as set forth in claim 1 wherein each back-plate chamber is defined by a tab and tooth that are stacked.

3. The pick-up device as set forth in claim 1 wherein each stripper band has a base and two flanges that extend from the base, a tooth or tab being between the two flanges of a corresponding stripper band.

4. The pick-up device as set forth in claim 1 wherein the second portion of the back-plate comprises fastening tabs that define slots between the teeth for the tines to pass through during rotation.

5. The pick-up device as set forth in claim 1 wherein the fastening plate and each chamber has an end at which the stripper bands are attached, the fastening plate and chamber angling away from each other toward the ends of the fastening plate and chamber to resist pull-out of the stripper band from its corresponding chamber.

6. The pick-up device as set forth in claim 1 wherein the first end and second end of each stripper band are separated by a distance $D_1$, the fastening plate and each chamber having an end at which the stripper bands are attached, there being a distance $D_2$ between the ends of the fastening plate and the chamber, $D_2$ being greater than $D_1$ to resist pull-out of the stripper band from its corresponding chamber.

7. The pick-up device as set forth in claim 1 comprising the tines.

8. The pick-up device as set forth in claim 1 wherein the first end of each stripper band is a lower end and the second end is an upper end relative to a vertical axis.

9. An apparatus for baling crop material, the apparatus comprising the pick-up device of claim 1.

10. The pick-up device as set forth in claim 1 wherein each stripper band is capable of moving within the back-plate chamber.

11. A pick-up device of a forage implement having rotating tines for transferring forage material from a surface over which the implement travels into the implement, the pick-up device comprising:
   stripper bands having a first end and a second end, the stripper bands defining slots between the stripper bands for tines to pass through during rotation of the tines; and
   a back-plate for securing the stripper bands having a lengthwise axis, the stripper bands having a first end and a second end, the back-plate comprising:
      a plurality of teeth for engaging the stripper bands toward their first end to limit the movement of the stripper bands in a direction transverse to a lengthwise axis of the implement, the teeth being elongated and projecting forward relative the lengthwise axis and having a length; and
      a plurality of tabs for engaging the stripper bands toward their first end to limit vertical movement of the stripper bands, the tabs being elongated and projecting forward relative the lengthwise axis and having a length, the tabs and the teeth being stacked along their length to form back-plate chambers for receiving the stripper bands.

12. The pick-up device as set forth in claim 11 wherein pairs of teeth and tabs define slots between adjacent pairs of teeth and tabs for the tines to pass through during rotation, the slots extending along the length of the teeth and tabs.

13. The pick-up device as set forth in claim 11 comprising a fastening plate for attaching the second end of the stripper bands, the fastening plate having a number of fastening tabs for attaching the stripper bands toward their second end.

14. The pick-up device as set forth in claim 13 wherein the fastening plate and at least one of the tabs and teeth are a single piece.

15. The pick-up device as set forth in claim 13 wherein the tabs are part of a tab plate, the fastening plate and tab plate each have respective ends for engaging the stripper bands, the fastening plate and tab plate angling away from each other toward their ends to resist pull-out of the stripper band from its corresponding chamber.

16. The pick-up device as set forth in claim 13 wherein the fastening plate and teeth each have respective ends for engaging the stripper bands, the ends of the fastening plate and teeth angling away from each other toward their ends to resist pull-out of the stripper band from its corresponding chamber.

17. The pick-up device as set forth in claim 11 wherein the tabs and the teeth are vertically stacked to form back-plate chambers for receiving the stripper bands.

18. The pick-up device as set forth in claim 11 wherein the back plate is free of fasteners for restricting the stripper bands from moving within the back-plate chamber.

19. The pick-up device as set forth in claim 11 wherein the back plate is free of pins for restricting the stripper bands from moving within the back-plate chamber.

20. The pick-up device as set forth in claim 11 wherein the tabs and the teeth are stacked along the entire length of the tabs or teeth.

21. The pick-up device as set forth in claim 11 wherein each tooth extends below a tab along a substantial length of the tab.

* * * * *